US011378162B2

(12) United States Patent
Nakamura et al.

(10) Patent No.: US 11,378,162 B2
(45) Date of Patent: Jul. 5, 2022

(54) SPEED REDUCER

(71) Applicant: Nabtesco Corporation, Tokyo (JP)

(72) Inventors: Koji Nakamura, Tokyo (JP); Takayuki Okimura, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/920,858

(22) Filed: Jul. 6, 2020

(65) Prior Publication Data

US 2021/0010563 A1 Jan. 14, 2021

(30) Foreign Application Priority Data

Jul. 9, 2019 (JP) .............................. JP2019-127916

(51) Int. Cl.
*F16H 1/14* (2006.01)
*F16H 1/20* (2006.01)
*F16H 57/038* (2012.01)

(52) U.S. Cl.
CPC ............. *F16H 1/14* (2013.01); *F16H 57/038* (2013.01)

(58) Field of Classification Search
CPC ............. F16H 1/12; F16H 1/14; F16H 57/038
See application file for complete search history.

(56) References Cited

U.S. PATENT DOCUMENTS

| 4,856,367 A * | 8/1989 | Nemoto ................... F16H 3/001 |
| | | 74/606 R |
| 2017/0248194 A1* | 8/2017 | Bae ........................... F16H 1/20 |
| 2020/0200251 A1 | 6/2020 | Roussel et al. |

FOREIGN PATENT DOCUMENTS

| CN | 102777575 A | 11/2012 |
| DE | 102007058903 A1 | 6/2009 |
| EP | 3211268 A1 | 8/2017 |
| EP | 3492776 A1 | 6/2019 |
| JP | 5231530 B2 | 7/2013 |
| WO | 2019/048753 A1 | 3/2019 |

OTHER PUBLICATIONS

Extended European Search Report dated Oct. 16, 2020 issued in corresponding European Patent Application No. 20183974.3 (10 pgs ).

* cited by examiner

*Primary Examiner* — Jake Cook
(74) *Attorney, Agent, or Firm* — Pillsbury Winthrop Shaw Pittman, LLP (57) ABSTRACT

A gear mechanism according to the invention includes a first shaft, a second shaft disposed at an angle with the first shaft, a first gear group including a plurality of first gears that transmit rotation of the first shaft to the second shaft; and a second gear group including a plurality of second gears that transmit, to an output side, rotation of the second shaft transmitted from the first shaft. A first second gear is situated closest to the second shaft among the plurality of second gears, a last second gear is situated closest to the output side among the plurality of second gears. A straight line that connects a rotation center of the first second gear and a rotation center of the last second gear form an angle with the first shaft when viewed in a direction along the second shaft.

9 Claims, 4 Drawing Sheets

(Prior Art)

SPEED REDUCER

CROSS-REFERENCE TO RELATED APPLICATIONS

This application is based on and claims the benefit of priority from Japanese Patent Application Serial No. 2019-127916 (filed on Jul. 9, 2019), the contents of which are hereby incorporated by reference in their entirety.

TECHNICAL FIELD

The present invention relates to a gear mechanism and a speed reducer.

BACKGROUND

Industrial robots, machine tools and the like may include a speed reducer to reduce the speed of rotation of a rotary drive source such as a motor (see, for example, Publication of Japanese Patent No. 5231530 ("the '530 Publication")). The '530 Publication describes a speed reduce in which a gear mechanism is interposed between an input gear and an output gear of a motor such that a driving force is transmitted via the gear mechanism.

When a speed reducer having such a gear mechanism is used to drive a turntable or the like, it is desirable that the thickness of the reducer in the vertical direction, that is, the dimension in the direction along the axis of the reducer be small so that the reducer can be made thin and flat. Thus a gear mechanism may be disposed such that a shaft axis of the motor intersects with the axis of the speed reducer.

In such a conventional speed reducer, a gear train of the gear mechanism and the motor shaft were arranged in series when viewed in the direction along the axis of the reducer at radially outward positions with the axis of the reducer as the center.

When a speed reducer is used for a turntable or the like, it is preferable that the speed reducer and the rotary drive source such as the motor be both covered by the turntable. That is, it is preferable that the outermost peripheral edge of the motor is situated inner than the outer diameter of the table when viewed from the center of the table along the axial direction. If the dimensions of the speed reducer and the motor are larger than the outer diameter of the table, the motor may protrude from a mounting surface of the table, which makes downsizing of the turntable difficult. For this reason, downsizing of the table will be limited by the size of the speed reducer and the motor that is required to have a predetermined power.

SUMMARY

The present invention endeavors to provide a gear mechanism and a speed reducer that can achieve both flattening and downsizing of a region viewed along the axial direction.

A gear mechanism according to one aspect of the invention includes: a first shaft, a second shaft disposed at an angle with the first shaft, a first gear group including a plurality of first gears that transmit rotation of the first shaft to the second shaft; and a second gear group including a plurality of second gears that transmit, to an output side, rotation of the second shaft transmitted from the first shaft, a first second gear being situated closest to the second shaft among the plurality of second gears, a last second gear being situated closest to the output side among the plurality of second gears, and a straight line that connects a rotation center of the first second gear and a rotation center of the last second gear form an angle with the first shaft when viewed in a direction along the second shaft.

In the gear mechanism according to the aspect, when viewed in the direction along the second shaft, the direction from the rotation center of the first second gear to the rotation center of the last second gear intersects with the direction in which the first shaft extends. Thus the rotation center of the last second gear is offset from the position on an extension of the first shaft when viewed in the direction along the second shaft. Therefore, compared with a configuration in which the rotation center of the last second gear is located at a position on the extension of the first shaft when viewed in the direction along the second shaft, it is possible to reduce an area for placing components necessary to transmit rotation from the first shaft side to the output side.

In the gear mechanism according to the aspect, the angle formed by the first shaft and the straight line connecting the rotation center of the first second gear and the rotation center of the last second gear may be a right angle when viewed in the direction along the second shaft.

In the gear mechanism according to the aspect, the first gear group may include a first bevel gear that is attached to the first shaft and a second bevel gear that is meshed with the first bevel gear and attached to the second shaft.

The gear mechanism according to the aspect may further include: a first casing housing the first gear group; a second casing housing the second gear group and attached to the first casing; and an output unit casing housing an output unit that includes a third shaft serving as the output side, the output casing being attached to the second casing at a position near the first casing, the output casing having a wall portion extending in a radial direction of the third shaft and a cut surface formed in the wall portion, and a thickness of the wall portion decreasing only in a portion close to the first casing to form the cut surface.

In the above gear mechanism, the output unit is arranged centered on the third shaft, and the output unit casing has a wall portion surrounding the radially outer side of the output unit centered on the third shaft. A wall portion of the output unit is provided substantially the whole circumference around the third shaft in the circumferential direction. The thickness of the wall portion of the output unit in the radial direction of the third shaft is substantially uniform in the circumference direction of the third shaft, but only a portion of the wall situated close to the first casing decreases in thickness. More specifically, the wall portion of the output unit has a substantially tubular shape, and the portion facing the first casing is formed into a planar cut surface corresponding to the side surface of the first casing. Thereby, the distance between the side surface of the first case and the wall portion of the output unit can be reduced. Therefore, when viewed in the direction along the second shaft, the distance from the third shaft to the side surface of the first casing can be reduced.

In the gear mechanism according to the aspect, a dimension of the first casing in a direction along the first shaft when viewed in a direction along the second shaft may be smaller than a dimension of the output unit casing in the direction along the first axis when viewed in the direction along the second shaft.

A gear mechanism according to another aspect of the invention includes: a first shaft, a second shaft disposed at an angle with the first shaft, a third shaft having an axis extending in a same direction as the second shaft; a first gear group including a plurality of first gears that transmit rotation of the first shaft to the second shaft; and a second gear group including a plurality of second gears that transmit rotation of the second shaft to the third shaft, a first second gear being situated closest to the second shaft among the plurality of second gears, a last second gear being situated closest to the third shaft among the plurality of second gears, and a straight line that connects a rotation center of the first second gear and a rotation center of the last second gear intersecting with the first shaft when viewed in a direction along the second shaft.

In the gear mechanism according to this aspect, when viewed in the direction along the second and third shafts, the direction from the rotation center of the first second gear to the rotation center of the last second gear intersects with the direction in which the first shaft extends. Thus the rotation center of the last second gear is offset from the position on an extension of the first shaft when viewed in the direction along the second and third shafts. Therefore, compared with a configuration in which the rotation center of the last second gear is located at a position on the extension of the first shaft when viewed in the direction along the second and third shafts, it is possible to reduce an area for placing components necessary to transmit rotation from the first shaft side to the third shaft side. Alternatively it is possible to reduce an area for placing the components necessary to transmit rotation from the third shaft side to the first shaft side.

The above gear mechanism may include: the first shaft inputting a rotational driving force; an output unit having an output axis that intersects with an input axis of the first shaft and outputting a rotational driving force; the first second gear having the second shaft that extends in a direction along the output axis and placing the second shaft at a position on an extension of the input axis when viewed in the direction along the output axis, the rotational driving force from the first gear being transmitted to the first second gear via the first gear group; and the last second gear having the third shaft that extends in the direction along the output axis and placing the third shaft at a position in a direction from the rotation center of the first second gear that intersect with a direction from the rotation center of the first second gear toward the input axis when viewed in the direction along the output axis, and the last second gear transmitting a rotational driving force to the output unit.

The above gear mechanism may include: the output unit having an output axis that intersects with the input axis of the first shaft, the output unit being driven by a rotational driving force outputted thereto; the first second gear having the second shaft that extends in a direction along the output axis and placing the second shaft on a predetermined circle centered on the output axis when viewed in the direction along the output axis, a rotational driving force being transmitted to the first second gear via the first gear group from the first shaft that extends in a direction of a tangent to the circle at the rotation center of the first second gear; and the last second gear having the third shaft that extends in the direction along the output axis and placing the third shaft closer to the output axis than the rotation center of the first second gear when viewed in the direction along the output axis, and the last second gear transmitting a rotational driving force to the output unit.

In the above gear mechanism, the first gear group may include bevel gears that mesh with each other.

A speed reducer according to an aspect of the invention includes: a first shaft, a second shaft disposed at an angle with the first shaft, a first gear group including a plurality of first gears that transmit rotation of the first shaft to the second shaft; and a second gear group including a plurality of second gears that transmit, to an output side, rotation of the second shaft transmitted from the first shaft, a first second gear being situated closest to the second shaft among the plurality of second gears, a last second gear being situated closest to the output side among the plurality of second gears, and a straight line that connects a rotation center of the first second gear and a rotation center of the last second gear form an angle with the first shaft when viewed in a direction along the second shaft; a rotary drive source for rotationally driving the first shaft; and a speed reducing unit serving as the output side that outputs rotation of the last second gear.

A speed reducer according to an aspect of the invention includes: The straight line connecting the rotation center of the first second gear and the rotation center of the last second gear located on the most output side forms an angle with the first shaft when viewed in the direction along the second shaft. In this way, it is possible to reduce the distance from the rotation center of the last second gear to the furthest point on the contour of the rotary drive source. Therefore it is possible to reduce an area for placing the speed reducer when viewed in the direction along the second shaft.

According to the aspects of the invention, it is possible to provide a gear mechanism and a speed reducer that can achieve both flattening and downsizing of a region viewed along the axial direction.

DESCRIPTION OF THE EMBODIMENTS

Figure 1:
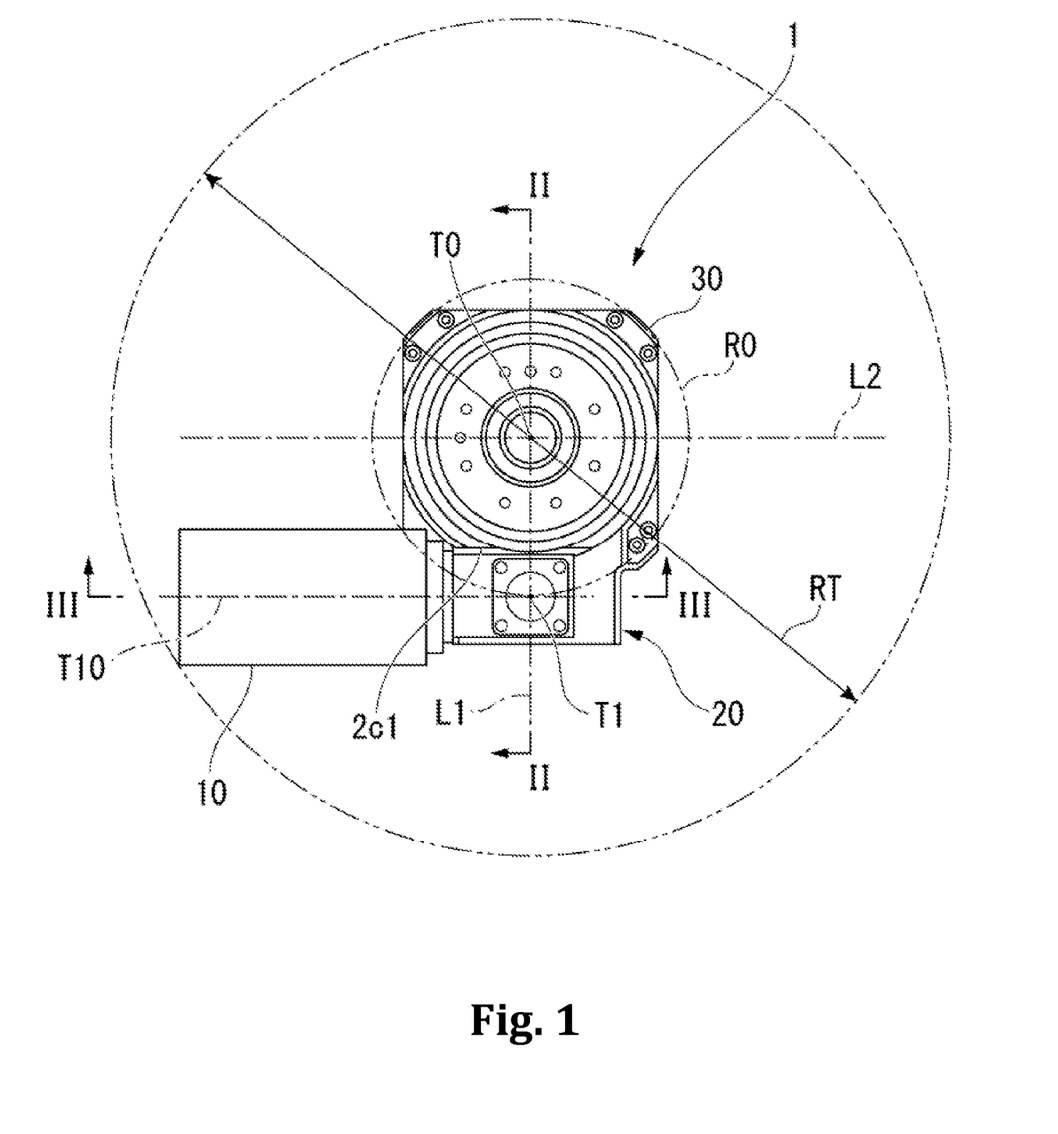
FIG. 1 is a plan view of a gear mechanism and a speed reducer according to an embodiment of the invention.
Figure 2:
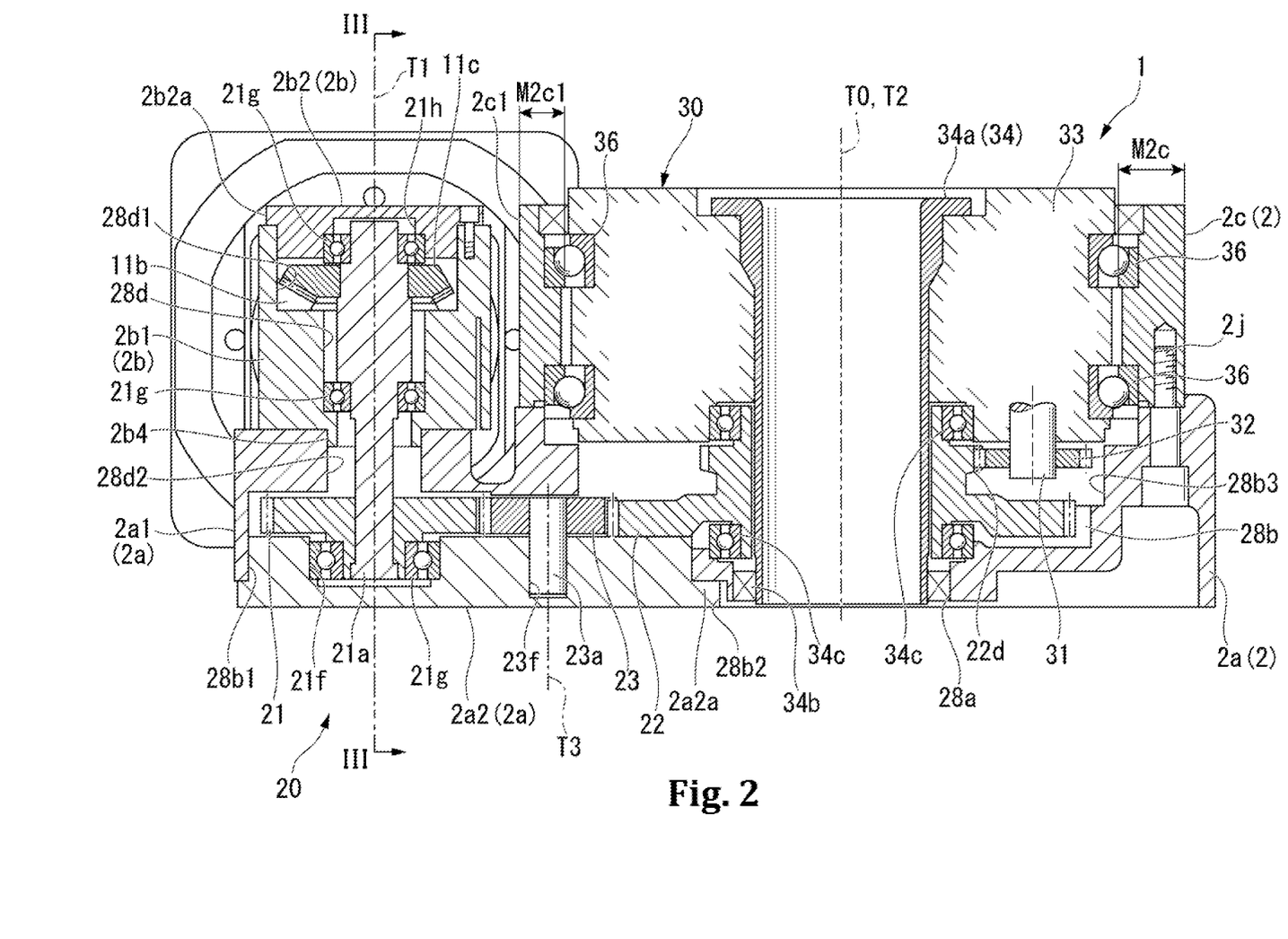
FIG. 2 is a sectional view along the line II-II in FIG. 1.
Figure 3:
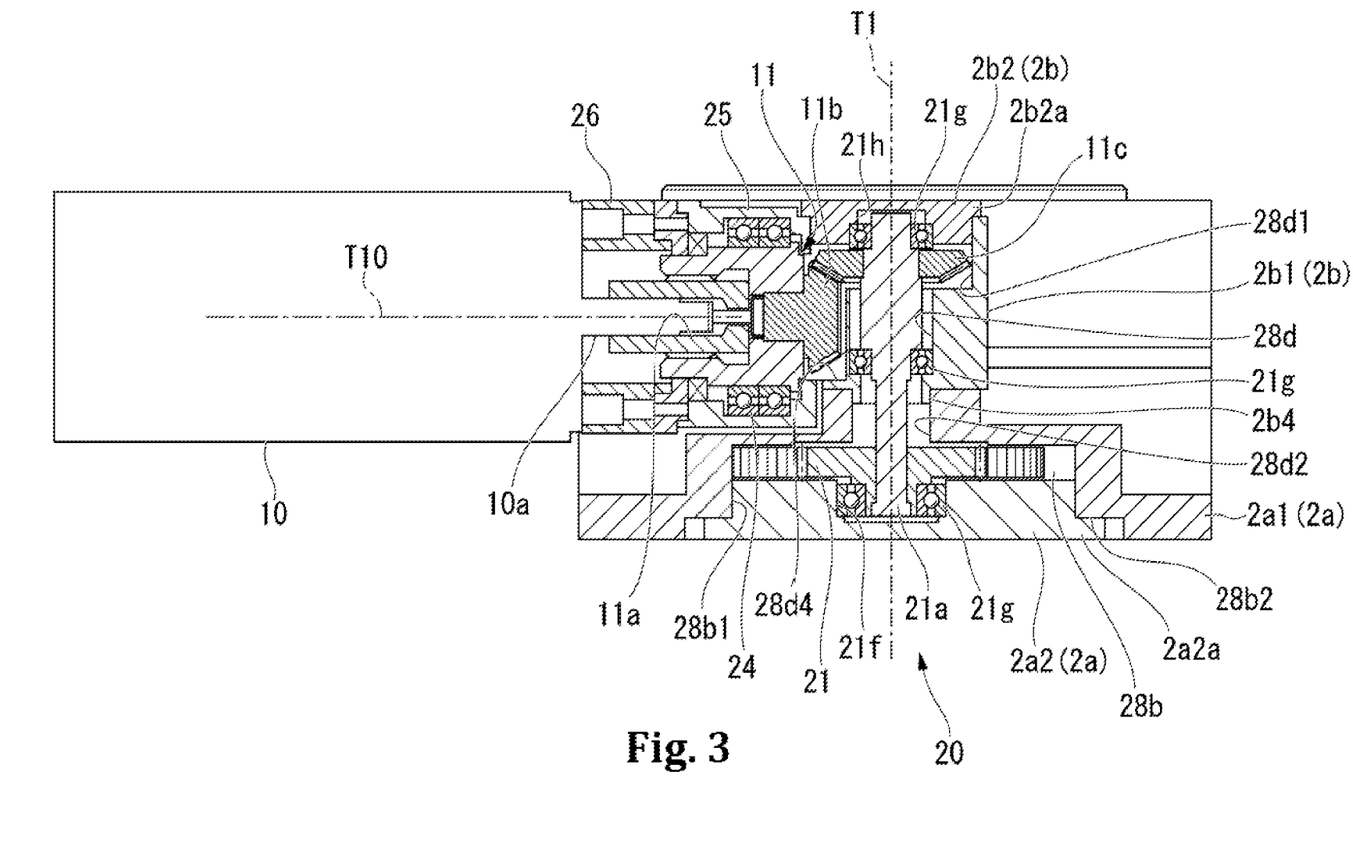
FIG. 3 is a sectional view along the line III-III in FIG. 1.

Embodiments of the invention will be hereinafter described with reference to the accompanying drawings. FIG. 1 is a plan view of a gear mechanism and a speed reducer according to an embodiment of the invention. FIG. 2 is a sectional view along the line II-II in FIG. 1. FIG. 3 is a sectional view along the line III-III in FIG. 1. In FIGS. 1 and 2, reference numeral 1 indicates a speed reducer.

As shown in FIG. 1, the speed reducer 1 according to an embodiment transmits a rotational driving force of a motor (rotary drive source) 10 to a speed reducing unit (output unit) 30 via a gear mechanism 20 and outputs a rotational force about an output axis T0 of the speed reducing unit 30 at a predetermined reduction ratio. The direction along the output axis T0 may be referred to as an upper-lower direction (vertical direction). The speed reducer 1 of the embodiment may be used to drive, for example, a turntable.

In the speed reducer 1, the gear mechanism 20 and the speed reducing unit 30 are housed in a casing 2 as shown in FIGS. 2 and 3. The motor 10 is attached to the outside of the casing 2. The motor 10 drives a drive shaft 10a that extends along a drive axis (input axis) T10 extending in a substantially horizontal direction. An input shaft (first shaft) 11 that has the input axis (first axis) coaxial with the drive shaft 10a is attached to the drive shaft 10a. The input shaft 11 is rotatably supported by the casing 2. The gear mechanism 20 moves in conjunction with the input shaft 11. The speed reducing unit 30 outputs a rotation speed lower than a rotation speed inputted thereto from the gear mechanism 20.

The motor 10 and the gear mechanism 20 are arranged adjacently to each other when viewed in the direction along the output axis T0. Similarly, the gear mechanism 20 and the speed reducing unit 30 are arranged adjacently to each other when viewed in the direction along the output axis T0. The motor 10 and the speed reducing unit 30 substantially overlap each other in the vertical direction along the output axis T0. The gear mechanism 20 is situated about the same position in the vertical direction along the output axis T0 as the motor 10 and the speed reducing unit 30, but slightly closer to the lower edge of the reducer.

The gear mechanism 20 includes a center gear (last second gear) 22 that rotates about a center axis (third axis) T2, an idler gear (second gear) 23 that meshes with the center gear 22, and an input gear (first second gear) 21 that meshes with the idler gear 23 that meshes with the motor 10 and to which a driving force of the motor 10 is inputted via the input shaft 11. The center gear 22, the idler gear 23, and the input gear 21 are all spur gears and are arranged along the same horizontal plane.

An idler axis T3 of the idler gear 23, an input gear axis (second axis) T1 of the input gear 21, and a center axis T2 of the center gear 22 are all parallel to the output axis T0. The center axis T2 of the center gear 22 coincides with the output axis T0. The center gear 22 rotates with the center axis T2 as its rotation center. The idler gear 23 rotates with the idler axis T3 as its rotation center. The input gear 21 rotates with the input gear axis T1 as its rotation center.

When viewed in the direction along the output axis T0, a straight line L1 connecting the output axis T0 of the speed reducing unit 30 and the input gear axis T1 of the input gear 21 intersects with the drive axis T10 of the drive shaft 10a and the input shaft 11. In the embodiment, when viewed in the direction along the output axis T0, the straight line L1 connecting the output axis T0 and the input gear axis T1 is orthogonal to the drive axis T10 of the drive shaft 10a and the input shaft 11.

The drive axis T10 of the drive shaft 10a and the input shaft 11 contact a circle R0 centered on the output axis T0 of the speed reducing unit 30 when viewed in the direction along the output axis T0. The circle R0 has a radius spanning from the output axis T0 of the speed reducing unit 30 to the input gear axis T1 of the input gear 21 when viewed in the direction along the output axis T0. The drive axis T10 of the drive shaft 10a and the input shaft 11 contacts the circle R0 at the position where the input gear axis T1 of the input gear 21 is situated when viewed in the direction along the output axis T0.

Further, when viewed in the direction along the output axis T0, a straight line L2 that passes through the position of the output axis T0 of the speed reducing unit 30 and extends parallel to the drive axis T10 of the drive shaft 10a and the input shaft 11 is orthogonal to the straight line L1 extending from the output axis T0 of the speed reducing unit 30 to the input gear axis T1 of the input gear 21. That is, when viewed in the direction along the output axis T0, the drive axis T10 of the drive shaft 10a and the input shaft 11, which is a tangent line to the circle R0, runs parallel with an offset to the straight line L2 passing through the output axis T0 which is the center of the circle R0.

The casing 2 has a base portion (second casing) 2a, a first block (first casing) 2b, and a second block (output unit casing) 2c. The base portion 2a is formed in a plate shape and is disposed along a horizontal plane orthogonal to the output axis T0. The base portion 2a is disposed along the lower surface of the speed reducer 1. When viewed in the direction along the output axis T0, the first block 2b that houses the gear mechanism 20 and a tubular second block 2c that houses the speed reducing unit 30 are arranged side by side on an upper surface of the base portion 2a.

The first block 2b and the second block 2c are coupled to the upper surface of the base portion 2a such that they are adjacent to each other. The first block 2b and the second block 2c project upward from the upper surface of the base portion 2a. The first block 2b and the base portion 2a are coupled to each other so as to seal the speed reducer 1.

The tubular second block 2c is disposed such that its central axis coincides with the output axis T0. The second block 2c is disposed adjacent to the first block 2b. An upper end of the second block 2c is disposed along the upper surface of the speed reducer 1. The second block 2c is fastened to the upper surface of the base portion 2a by a bolt 2j or the like. The second block 2c and the base portion 2a are coupled to each other so as to seal the speed reducer 1.

The tubular second block 2c is provided substantially the whole circumference around the output axis T0 in the circumferential direction. A wall portion of the output unit is provided substantially the whole circumference around a third shaft in the circumferential direction. Further, a cut surface 2c1 is formed on the second block 2c at a position facing the first block 2b. The cut surface 2c1 is a vertical surface parallel to the output axis T0. The cut surface 2c1 is the vertical surface parallel to the straight line L2 when viewed in the direction along the output axis T0. That is, the second block 2c has a cylindrical shape whose thickness in the radial direction of the output axis T0 is substantially uniform in the circumferential direction of the output axis T0. Only a portion of the second block 2c close to the first block 2b is cut flatly to form the cut surface 2c1. Specifically, the second block 2c is formed in the cylindrical shape having an uniform radial thickness, and the planar cut surface 2c1 is formed in the portion facing the first block 2b such that the surface corresponds to the facing surface of the first block 2b. As shown in FIG. 2, the second block 2c has a minimum thickness M2c1 at the portion of the cut surface 2c1 that is smaller than a thickness M2c at the other portions thereof.

The base portion 2a includes a plate-like first base portion 2a1 and a plate-like second base portion 2a2 that has a profile smaller than the first base portion 2a1. The first base portion 2a1 has a profile to which both the first block 2b and the second block 2c can be attached. The second base portion 2a2 has the profile corresponding to the first block 2b, and is fitted into a region of the first base portion 2a1 corresponding to the first block 2b to form a single unit, which will be described later. The first base portion 2a1 and the second base portion 2a2 are coupled to each other so as to seal the internal space 28b of the speed reducer 1. The first base portion 2a1 has a thickness larger than the second base portion 2a2 so that the second base portion 2a2 can be fitted therein as described later. The second base portion 2a2 is exposed on the lower surface of the speed reducer 1. The second base portion 2a2 is integrally coupled to the first base portion 2a1 at a position opposite to the first block 2b in the vertical direction.

The first block 2b includes a first block side portion 2b1 that is integrally coupled to an upper surface of the first base portion 2a1 and a first block plate 2b2 that is integrally coupled to an upper surface of the first block side portion 2b1. The first block side portion 2b1 projects upward from the upper surface of the plate-like first base portion 2a1. The first block plate 2b2 is coupled such that it closes an inner space of the first block side portion 2b1. The first block plate 2b2 is disposed substantially parallel to the first base portion 2a1 and the second base portion 2a2. The first block plate 2b2 is disposed along the upper surface of the speed reducer 1. A tip of the input shaft 11 that transmits a rotational driving force of the motor 10 to the gear mechanism 20 penetrates through the first block 2b. The input shaft 11 is oriented in the horizontal direction.

The motor 10 includes the drive shaft 10a. The motor 10 is fixed to a side of the first block side portion 2b1. A tip portion of the drive shaft 10a serves as the input shaft 11 that penetrates the casing 2. A press-fitting hole 11a into which the drive shaft 10a of the motor 10 is fitted is formed in an outer edge surface of the input shaft 11. The motor 10 is fixed to a motor support member 26 attached to the first block 2b. The drive shaft 10a of the motor 10 is inserted into the press-fitting hole 11a of the input shaft 11 such that the drive axis T10 extends in the horizontal direction (direction parallel to the base portion 2a). The motor 10 is situated slightly above the upper outer surface of the base portion 2a (on the first block 2b side).

A drive gear (first bevel gear, first gear) 11b is attached to the tip of the input shaft 11. The drive gear 11b is provided in a disk-shaped portion that projects radially from the outer peripheral surface of the input shaft 11, and teeth are formed on an outer edge of the disk-shaped portion. A driven gear (second bevel gear, first gear) 11c meshes with the drive gear 11b. In the embodiment, the drive gear 11b and the driven gear 11c are bevel gears. However, the drive gear 11b and the driven gear 11c are not limited to bevel gears. Any structure may be adopted provided that the drive axis T10 of the drive gear 11b is disposed at a position where it intersects with the input gear axis T1 of an input gear shaft 21a of the driven gear 11c and a driving force can be transmitted from the drive gear 11b to the driven gear 11c. The input gear shaft 21a extending in the vertical direction coincides with a rotation axis of the driven gear 11c. The driven gear 11c is disposed close to the second block 2c in the vertical direction of the input shaft 21a.

The input gear shaft 21a is a shaft member that extends linearly and concentrically with the rotation axis of the driven gear 11c. The input gear shaft 21a is supported by a bearing 21g described later such that the input gear axis T1 is orthogonal to the drive axis T10 of the input shaft 11. That is, the input gear shaft 21a is rotatably supported by the casing 2. In the embodiment, the drive axis T10 of the input shaft 11 is parallel to the upper surface of the speed reducer 1, and the input gear axis T1 of the input gear shaft 21a is orthogonal to the upper surface of the speed reducer 1. The positional relationship between the input gear axis T1 of the input gear shaft 21a and the drive axis T10 of the input shaft 11 is not limited to orthogonal to each other, but may be arranged in other positional relationship except for parallel to each other. For example, the drive axis T10 of the input shaft 11 may be tilted in the vertical direction so that an end of the drive axis on the motor 10 side is lowered from the horizontal position.

The driven gear 11c has a disk-shaped portion that projects radially from the outer peripheral surface of the input gear shaft 21a, and teeth are formed on an outer edge of the disk-shaped portion. The outer edge of the driven gear 11c protrudes into an enlarged diameter portion 28d1 formed in the first block 2b. As will be described later, the enlarged diameter portion 28d1 serves as an upper end of an internal space 28d formed in the first block side portion 2b1 and is closed by the first block plate 2b2.

An internal space 28b is formed in the first base portion 2a1 at a middle portion thereof in the vertical direction. The internal space 28b is formed along a horizontal plane orthogonal to the output axis T0.

Two through holes 28a and 28d2 penetrating in the vertical direction are formed in the first base portion 2a1. Both the through hole 28a and the through hole 28d2 communicate with the internal space 28b. The through hole 28a is arranged with the output axis T0 as a center line, and is formed in a shape concentric with the tubular second block 2c. The through hole 28a extends from the inner space 28b to the outside of the lower surface of the speed reducer 1. The through hole 28d2 is formed at a position corresponding to the center of the input gear 21. The through hole 28d2 communicates with the internal space 28b and the internal space 28d of the first block 2b which will be described later.

The input gear (first second gear) 21, the idler gear (second gear) 23, and the center gear (last second gear) 22 included in the gear mechanism 20 are housed in the internal space 28b such that they mesh with each other. The internal space 28b includes a portion formed in a shape concentric with the input shaft 21a, a portion formed in a shape concentric with an idler shaft 23a, and a portion corresponding to a shape concentric with the center gear 22. These portions are formed continuously and the internal space 28b has such a planar contour shape.

As the gear mechanism 20, the input gear 21 in the internal space 28b is coupled to the input shaft 11 that transmits a rotational driving force from the motor 10. In the internal space 28b, the idler gear 23 meshes with the input gear 21 and is rotatably held by the first base portion 2a1 and the second base portion 2a2. The center gear 22 is situated in the internal space 28b and meshes with the idler gear 23 to transmit rotation of the input gear 21.

The center gear 22 has a larger diameter than the input gear 21 and has the number of teeth larger than that of the input gear 21. Thus, the number of rotations of the input gear 21 driven by the motor 10 is reduced at a predetermined reduction ratio and the reduced rotation is transmitted to the center gear 22.

An opening 28b1 is formed in the first base portion 2a1 at a lower position facing the input gear 21 and the idler gear 23 in the internal space 28b. The second base portion 2a2 is fitted from the lower side and the opening 28b1 is closed by the second base portion 2a2. The second base portion 2a2 is fixed at a position where it reaches halfway of the internal space 28b in the vertical direction.

An enlarged diameter portion 28b2 is formed in the first base portion 2a1 at an edge of the opening 28b1 facing downward in the internal space 28b. The enlarged diameter portion 28b2 is formed by a stepped portion. A flange portion 2a2a that projects around the second base portion 2a2 is fitted into the enlarged diameter portion 28b2. In this state, a surface of the enlarged diameter portion 28b2 and a surface of the flange portion 2a2a that face each other in the vertical direction come into contact with each other. Thereby the second base portion 2a2 is fixed with respect to the first base portion 2a1 in the vertical direction. The enlarged diameter portion 28b2 may extend to an end of the first base portion 2a1 where forms the outline of the first base portion 2a1 in the horizontal direction. A sealing member (sealing means) such as an O-ring may be provided around the opening 28b1 at a position above the flange 2a2a.

In the second base portion 2a2, a bottomed support hole 21f and a bottomed support hole 23f that each have a circular cross section are formed with a certain space therebetween on the surface facing the inner space 28b. The bearing 21g is attached in the support hole 21f. The bearing 21g is attached to an inner peripheral surface of the support hole 21f. The bearing 21g supports an lower end of the input shaft 21a. The input shaft 21a has the input gear axis T1 extending in the vertical direction along the output axis T0. The lower end of the input shaft 21a is inserted into the support hole 21*f*. The input gear 21 is attached to the input shaft 21*a* near the lower end portion of the input shaft 21*a*. The support hole 23*f* rotatably supports the idler shaft 23*a*. The idler shaft 23*a* has the idler axis T3 extending in the vertical direction along the output axis T0. A lower end of the idler shaft 23*a* is inserted into the support hole 23*f*. The idler gear is coupled to the idler shaft 23*a*.

The internal space 28*d* extending in the vertical direction is formed in the first block side portion 2*b*1 at a position facing the support hole 21*f*. The internal space 28*d* extends in the vertical direction, and a lower end thereof communicates with the internal space 28*b* via a through hole 28*d*2. The internal space 28*d* has a circular cross section corresponding to the through hole 28*d*2. An upper end of the internal space 28*d* is closed by the first block plate 2*b*2. A bottomed support hole 21*h* having a circular cross section is formed in a lower surface of the first block plate 2*b*2 that faces the internal space 28*d*. The bearing 21*g* is attached in the support hole 21*h*. The bearing 21*g* is attached to an inner peripheral surface of the support hole 21*h*. The bearing 21*g* supports the input shaft 21*a*. The upper end of the input shaft 21*a* is inserted into the support hole 21*h*.

In the first block 2*b*, the enlarged diameter portion 28*d*1 is formed at the upper end of the internal space 28*d*. The driven gear 11*c* is housed in the enlarged diameter portion 28*d*1 below the bearing 21*g*. An lower end of the first block plate 2*b*2 is fitted into the upper end of the internal space 28*d*. Around an upper end of the first block plate 2*b*2, a flange portion 2*b*2*a* is provided such that it projects radially outward. The flange portion 2*b*2*a* contacts an upper end of the first block side portion 2*b*1 thereby the vertical position of the first block plate 2*b*2 relative to the first block side portion 2*b*1 is fixed. At the same time, the first block side portion 2*b*1 and the first block plate 2*b*2 tightly contact with each other to seal the internal space 28*d*. On the outer peripheral surface of the first block plate 2*b*2, a sealing member (sealing means) such as an O-ring may be provided at a position below the flange portion 2*b*2*a* and inserted into the first block side portion 2*b*1.

The bearing 21*g* that supports a middle portion of the input shaft 21*a* in the axial direction is attached to the first block 2*b* near the lower end of the internal space 28*d*. The bearing 21*g* is attached to the inner peripheral surface of the first block side portion 2*b*1 facing the internal space 28*d*. At the lower end of the first block side portion 2*b*1 that defines the lower end of the internal space 28*d*, a ridge 2*b*4 protruding downward is formed around the through hole 28*d*2. The ridge 2*b*4 is inserted into the through hole 28*d*2 and is used for aligning the first block side portion 2*b*1 with the first base portion 2*a*1.

In the first block 2*b*, provided is a through hole 28*d*4 extending in the horizontal direction in and blow the internal space 28*d* at a position corresponding to the enlarged diameter portion 28*d*1 in the vertical direction. The through hole 28*d*4 is formed so as to extend in the direction toward the motor 10. The drive gear 11*b* is housed in the through hole 28*d*4. An input shaft support portion 25 is formed outside the through hole 28*d*4 such that it surrounds the periphery of the input shaft 11 and is continuous with the first block side portion 2*b*1. The input shaft support portion 25 has a tubular shape that surrounds the periphery of the input shaft 11, and a bearing 24 is disposed inside the input shaft support portion 25. The bearing 24 rotatably supports the input shaft 11. A motor support member 26 is fixed on the outer side of the input shaft support portion 25. An inner periphery of the input shaft support portion 25 has a diameter corresponding to the through hole 28*d*4. The input shaft support portion 25 and the first block side portion 2*b*1 house the input shaft 11 and the drive gear 11*b* and seal them from the outside.

An opening 28*b*3 is formed in the first base portion 2*a*1 above the internal space 28*b* facing the center gear 22. The opening 28*b*3 is closed by the second block 2*c* and the speed reducing unit 30. The opening 28*b*3 has a planar contour shape with the output axis T0 as a center and concentric with the second block 2*c* and the center gear 22.

In the internal space 28*b*, the center gear 22 is rotatably supported by a hollow cylinder 34. The cylinder 34 vertically penetrates the internal space 28*b*. The cylinder 34 is disposed centering on the output axis T0. The cylinder 34 penetrates the speed reducer 1 in the vertical direction. A lower end of the cylinder 34 is fitted in the through hole 28*a*. A seal member 34*b* may be provided between the lower end of the cylinder 34 and the inner surface of the through hole 28*a*. At an upper end of the cylindrical body 34, a flange portion 34*a* exposed on the upper surface of the speed reducing unit 30 is formed. The flange portion 34*a* is recessed downward from the upper surface of the speed reducer 1. The cylinder 34 is disposed substantially at the center of the opening 28*b*3.

The center gear 22 is integrally formed with a gear 22*d* provided concentrically to each other. The gear 22*d* has a smaller number of teeth and a smaller diameter than those of the center gear 22. The center gear 22 and the gear 22*d* are rotatable as a single unit around the cylinder 34. The gear 22*d* is disposed above the center gear 22. The gear 22*d* is disposed closer to the speed reducing unit 30 than the center gear 22. The gear 22*d* is situated on an input side of the speed reducing unit 30. The gear 22*d* is housed in the opening 28*b*3. A lower end of the center gear 22 is rotatably supported near the through hole 28*a* via a bearing 34*c*. An upper end of the center gear 22 is supported rotatably relative to the speed reducing unit 30 via the bearing 34*c*.

The speed reducing unit 30 is housed in the tubular second block 2*c* fixed to the first base portion 2*a*1. The speed reducing unit 30 may be, for example, an eccentric oscillating type speed reducer. The speed reducing unit 30 includes a carrier 33 arranged on the inner side of the second block 2*c* and a transmission shaft 31 that rotates as the center gear 22 rotates.

The carrier 33 is rotatable relative to the second block 2*c* about the output axis T0. Specifically, relative rotation between the second block 2*c* and the carrier 33 is allowed by the bearing 36 provided between the inner periphery of the second block 2*c* and the outer periphery of the carrier 33. The carrier 33 is exposed on the upper surface of the speed reducing unit 30. The carrier 33 situated on an output side of the speed reducing unit 30. The lower end of the speed reducing unit 30 faces the opening 28*b*3. The cylinder 34 penetrates the center of the carrier 33. An axis of the carrier 33 coincides with the output axis T0 which is the axis of the cylinder 34. The cylinder 34 may be fixed to, for example, the carrier 33.

The transmission shaft 31 is situated on the input side of the speed reducing unit 30 to which a rotational driving force is transmitted from the center gear 22. The transmission shaft 31 is rotatably attached to the carrier 33 and has an axis parallel to the output axis T0. The speed reducing unit 30 rotates the second block 2*c* and the carrier 33 relatively in conjunction with rotation of the transmission shaft 31 at a speed lower than a rotation speed of the transmission shaft 31. The transmission shaft 31 is provided with a transmission gear 32 that meshes with the gear 22*d*. The transmission gear 32 is a spur gear.

The speed reducer 1 in the embodiment may be fixed to a flat surface where the speed reducer is supposed to be installed. Then, a turntable or the like may be placed on the upper surface of the carrier 33. In this case, the turntable is fixed to the upper surface of the carrier 33 by a fastening bolt.

In such a speed reducer 1, when the motor 10 is driven, the drive shaft 10a rotates and the input shaft 11 coaxially integrated with the drive shaft 10a rotates. Accordingly, the driven gear 11c meshed with the drive gear 11b provided on the input shaft 11 is driven, and the input shaft 21a of the gear mechanism 20 rotates about the input gear axis T1. As the input shaft 21a rotates, the input gear 21 coupled to the input shaft 21a rotates around the input gear axis T1. The rotation of the input gear 21 causes the idler gear 23 meshed with the input gear 21 to rotate around the idler shaft 23a. As the idler gear 23 rotates, the center gear 22 meshed with the idler gear 23 rotates around the output axis T0. When the center gear 22 rotates, the gear 22d that is coaxial and integrated with the center gear 22 rotates. As a result, the transmission gear 32 meshed with the gear 22d rotates, and the transmission shaft 31 integrated with the transmission gear 32 rotates. Due to the rotation of the transmission shaft 31, the second block 2c and the carrier 33 that serve as the outer cylinder of the speed reducing unit 30 rotate relatively to each other at a speed slower than the rotation speed of the transmission shaft 31. This causes the turntable to rotate.

In the speed reducer 1 of the embodiment, the straight line L1 and the drive axis T10 are orthogonal to each other, and the straight line L1 and the straight line L2 are orthogonal to each other when viewed in the direction along the output axis T0. Further, the straight line L2 and the drive axis T10 are parallel and offset to each other. Thus, in the speed reducer 1 of the embodiment, the distance from the output axis T0, which is the center of the speed reducer 1, to the furthest position in the contour of the motor 10 when viewed in the direction along the output axis T0 is indicated by a distance RT in FIG. 1.

Figure 4:
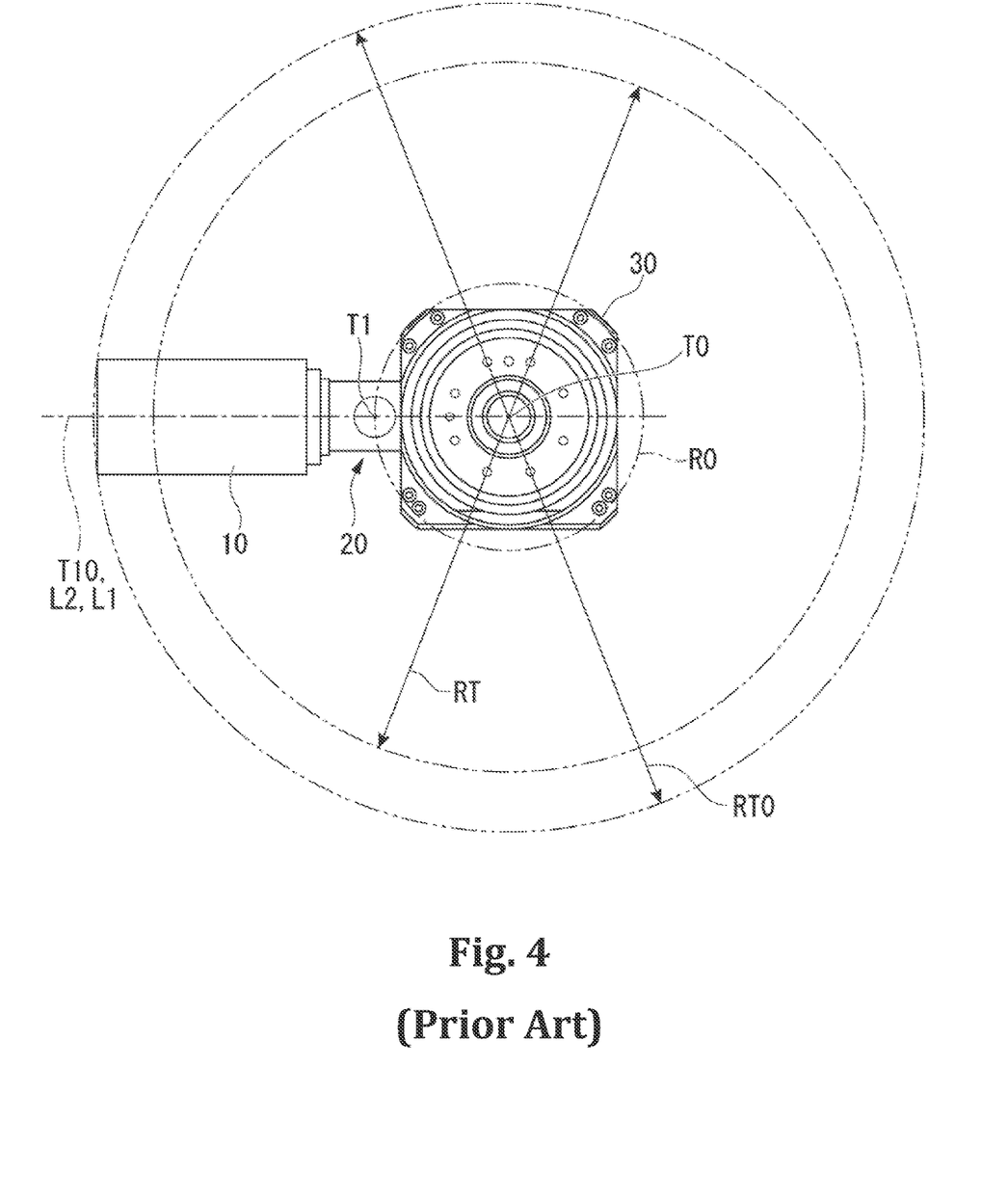
FIG. 4 is a plan view of a conventional speed reducer.

FIG. 4 is a plan view of a conventional speed reducer. In contrast to the speed reducer 1 of the embodiment shown in FIG. 1, the conventional speed reducer has the drive axis T10 of the drive shaft 10a and the input shaft 11 that coincide with a straight line connecting the output axis T0 of the speed reducing unit 30 and the input gear axis T1 of the input gear 21 when viewed in the direction along the output axis T0 as shown in FIG. 4. In this case, the distance from the output axis T0, which is the center of the speed reducer 1, to the furthest position in the contour of the motor 10 is indicated as a distance RT0 in FIG. 4. The reducer shown in FIG. 4 is different from the reducer shown in FIGS. 1 to 3 in the arrangement of components, but the same reference numerals are used for the components corresponding to those of the reducer of FIGS. 1 to 3.

In the configuration shown in FIG. 4, the distance RT is shorter than the distance RT0 by the amount that the straight line L1 orthogonally crosses. Comparing the conventional reducer to the reducer of the embodiment, it is obvious that in the embodiment can reduce the area on the horizontal surface where the speed reducer 1 is installed. More specifically, in the conventional configuration shown in FIG. 4, it was not possible to hide the speed reducer by a turntable unless the table has a diameter of RT0. Whereas in the present embodiment, it can be understood that the speed reducer 1 can be hidden by a turntable having a diameter of RT and thus a smaller planar profile. In this manner, the size of the reducer 1 in the radial direction can be reduced as compared with the configuration in which the drive shaft 10a passes through the output axis T0.

A gear mechanism according to the embodiment of the invention may include: an input shaft inputting a rotational driving force; an output unit having an output axis that intersects with an input axis of the input shaft and to which a rotational driving force is outputted; an input gear having an input gear axis that extends in a direction along the output axis and is disposed at a position on an extension of the input axis when viewed in the direction along the output axis, and a rotational driving force from the input shaft being transmitted to the input gear; and a center gear having a center axis that extends in the direction along the output axis and is disposed in a direction from the input gear axis that intersect with a direction from the input gear axis toward the input axis when viewed in the direction along the output axis, and the center gear transmitting a rotational driving force to the output unit.

According to this configuration, when viewed in the direction along the output axis, the direction from the input gear axis to the center axis intersects with the direction in which the input axis extends. Thus the position of the output axis is offset from the position on an extension of the input axis when viewed in the direction along the output axis. Therefore, compared with a configuration in which the output axis is located at a position on the extension of the input axis when viewed in the direction along the output axis, it is possible to reduce an area for placing components necessary to transmit a rotational driving force from the input side to the output unit. In other words, it is possible to reduce the area from the output axis to the furthest point of the contour of the rotary drive source on the input side.

In the gear mechanism according to the embodiment of the invention, the input shaft and the rotation axis of the input gear can transmit a driving force via the bevel gears that mesh with each other. In this manner, the dimension in which the output unit and the rotary drive source serving as the input side are arranged can be shortened when viewed in the direction along the output axis, and therefore the gear mechanism can be made thin and flat.

A gear mechanism according to another embodiment of the invention may include: an input shaft inputting a rotational driving force; the output unit having an output axis that intersects with an input axis of the first shaft, the output unit being driven by a rotational driving force outputted thereto; an input gear having an input gear axis that extends in a direction along the output axis and is disposed at a position on a predetermined circle centered on the output axis when viewed in the direction along the output axis, a rotational driving force being transmitted to the input gear from the input shaft extending in a direction of a tangent to the circle at the position of the input gear axis; and a center gear having a center axis that extends in the direction along the output axis and is disposed closer to the output axis than the input gear axis when viewed in the direction along the output axis, and the center gear transmitting a rotational driving force to the output unit.

According to this configuration, when viewed in the direction along the output axis, the direction from the input gear axis to the center axis is arranged in the radial direction with respect to the output axis which is the center of the circle. Moreover, when viewed in the direction along the output axis, the direction of the tangent to the circle in which the input axis extends runs parallel with an offset to the straight line passing through the output axis which is the center of the circle. According to this configuration, when viewed in the direction along the output axis, the direction from the input gear axis to the center axis intersects with the direction in which the input axis extends. Therefore, when viewed in the direction along the output axis, it is possible to reduce the diameter of the circle and a storing area extending to the farthest point in the contour of rotary drive source in the direction in which the input axis extends.

Although the above embodiments described as the speed reducer 1 is used for driving the turntable and the speed reducer 1 is placed on the surface extending in the horizontal direction, the structure and application are not limited to these. The speed reducer 1 in another embodiment may be fixed to a mounting surface extending in a direction other than horizontal. Although the above embodiments described as the output side is the carrier 33 in the speed reducing unit 30, the configuration is not limited to this. Either the carrier 33 or the tubular second block 2c may be served as the output side.

Application of the gear mechanism according to the invention is not limited to the speed reducer 1 of the above-described embodiment, but may be applied to any machine or device.

What is claimed is:

1. A gear mechanism, comprising:
a first shaft;
a second shaft disposed at an angle with the first shaft;
a first gear group including a plurality of first gears that transmit rotation of the first shaft to the second shaft;
a second gear group including a plurality of second gears that transmit, to an output side, rotation of the second shaft transmitted from the first shaft, a first second gear being situated closest to the second shaft among the plurality of second gears, a last second gear being situated closest to the output side among the plurality of second gears, and a straight line connecting a rotation center of the first second gear and a rotation center of the last second gear, the straight line forming an angle with the first shaft when viewed in a direction along the second shaft,
a first casing housing the first gear group;
a second casing housing the second gear group and attached to the first casing; and
an output unit casing housing an output unit that includes a third shaft serving as the output side, the output unit casing being attached to the second casing at a position adjacent the first casing, the output unit casing having a wall portion extending in a radial direction of the third shaft and a cut surface formed in the wall portion, and a thickness of the wall portion decreasing only in a portion facing the first casing to form the cut surface.

2. The gear mechanism of claim 1, wherein the angle formed by the first shaft and the straight line connecting the rotation center of the first second gear and the rotation center of the last second gear is a right angle when viewed in the direction along the second shaft.

3. The gear mechanism of claim 1, wherein the first gear group includes a first bevel gear that is attached to the first shaft and a second bevel gear that is meshed with the first bevel gear and attached to the second shaft.

4. The gear mechanism of claim 1, wherein a dimension of the first casing that extends entirely across the first casing along a direction parallel to the first shaft and when viewed in a direction along the second shaft is smaller than a dimension of the output unit casing that extends entirely across the output unit casing along the direction parallel to the first axis and when viewed in the direction along the second shaft.

5. The gear mechanism of claim 1,
wherein the third shaft has an axis extending in a same direction as the second shaft;
wherein the second gear group includes the plurality of second gears that transmit rotation of the second shaft to the third shaft.

6. The gear mechanism of claim 5, comprising:
the first shaft inputting a rotational driving force;
the output unit having an output axis that intersects with an input axis of the first shaft and outputting a rotational driving force;
the first second gear having the second shaft that extends in a direction along the output axis and placing the second shaft at a position on an extension of the input axis when viewed in the direction along the output axis, the rotational driving force from the first shaft being transmitted to the first second gear via the first gear group; and
the last second gear having the third shaft that extends in the direction along the output axis and placing the third shaft at a position along the straight line that forms the angle with the first shaft and from an intersection of the rotation center of the first second gear the input axis when viewed in the direction along the output axis, and the last second gear transmitting a rotational driving force to the output unit.

7. The gear mechanism of claim 6, comprising:
the output unit being driven by a rotational driving force outputted thereto;
the first second gear placing the second shaft on a predetermined circle having a center on the output axis and having a radius spanning from the output axis of the output unit to the input axis of the first shaft when viewed in the direction along the output axis,
the rotational driving force being transmitted to the first second gear via the first gear group from the first shaft that extends in a direction of a tangent to the circle at the rotation center of the first second gear; and
the last second gear placing the third shaft closer to the output axis than the rotation center of the first second gear when viewed in the direction along the output axis.

8. The gear mechanism of claim 5, wherein the first gear group includes bevel gears that mesh with each other.

9. A speed reducer, comprising:
a first shaft;
a second shaft disposed at an angle with the first shaft;
a first gear group including a plurality of first gears that transmit rotation of the first shaft to the second shaft;
a second gear group including a plurality of second gears that transmit, to an output side, rotation of the second shaft transmitted from the first shaft, a first second gear being situated closest to the second shaft among the plurality of second gears, a last second gear being situated closest to the output side among the plurality of second gears, and a straight line connecting a rotation center of the first second gear and a rotation center of the last second gear, the straight line forming an angle with the first shaft when viewed in a direction along the second shaft;
a first casing housing the first gear group;
a second casing housing the second gear group and attached to the first casing; and
an output unit casing housing an output unit that includes a third shaft serving as the output side, the output unit casing being attached to the second casing at a position adjacent the first casing, the output unit casing having a wall portion extending in a radial direction of the third shaft and a cut surface formed in the wall portion, and a thickness of the wall portion decreasing only in a portion facing the first casing to form the cut surface;
a rotary drive source for rotationally driving the first shaft; and
a speed reducing unit serving as the output side that outputs rotation of the last second gear.

* * * * *